United States Patent [19]

Reip

[11] Patent Number: 4,722,361
[45] Date of Patent: Feb. 2, 1988

[54] MODULATING PRESSURE OPERATED PILOT RELIEF VALVE

[75] Inventor: Raymond G. Reip, Indian Head Park, Ill.

[73] Assignee: Vapor Corporation, Chicago, Ill.

[21] Appl. No.: 832,042

[22] Filed: Feb. 19, 1986

Related U.S. Application Data

[63] Continuation-in-part of Ser. No. 534,594, Sep. 22, 1983, Pat. No. 4,615,356.

[51] Int. Cl.$^4$ ............................................. G05D 16/00
[52] U.S. Cl. ..................................... 137/488; 137/492; 137/627.5; 137/596.18
[58] Field of Search ............ 137/488, 491, 492, 492.5, 137/627.5, 596.18, 102, 116.3

[56] References Cited

U.S. PATENT DOCUMENTS

| | | | |
|---|---|---|---|
| 2,649,115 | 8/1953 | Deardorff | 137/488 |
| 2,877,791 | 3/1959 | Rich | 137/488 X |
| 3,754,566 | 8/1973 | Gemigniani | 137/488 |
| 3,771,553 | 11/1973 | Huet | 137/488 |

Primary Examiner—Alan Cohan
Attorney, Agent, or Firm—Francis J. Lidd

[57] ABSTRACT

The pilot valve 206 disclosed utilizes a piston 226 operating intermediate a pressure setting spring 234 and main valve head volume 222 vent valve, and having a single pressure sensing chamber 235. The operating piston includes an elongated extension 229 of reduced diameter extending from the piston adjacent the sensing chamber and incorporates an opposite end, secondary relief chamber 230 providing main valve operation at pressures fixedly related to the operating piston relief setting. The piston extension operates the vent valve 245 in an adjacent chamber. The piston further defines an internal cavity 240 containing a somewhat coaxial inlet valve 251, 252. Inlet and exhaust valves are in fluid communication through said piston extension. Main valve head volume venting and pressurizing is accomplished through valve body ports cooperating with said inlet and exhaust valves. Product backflow, and main valve head volume repressurization are prevented through the use of ported check valves internal of the pilot operating piston.

14 Claims, 16 Drawing Figures

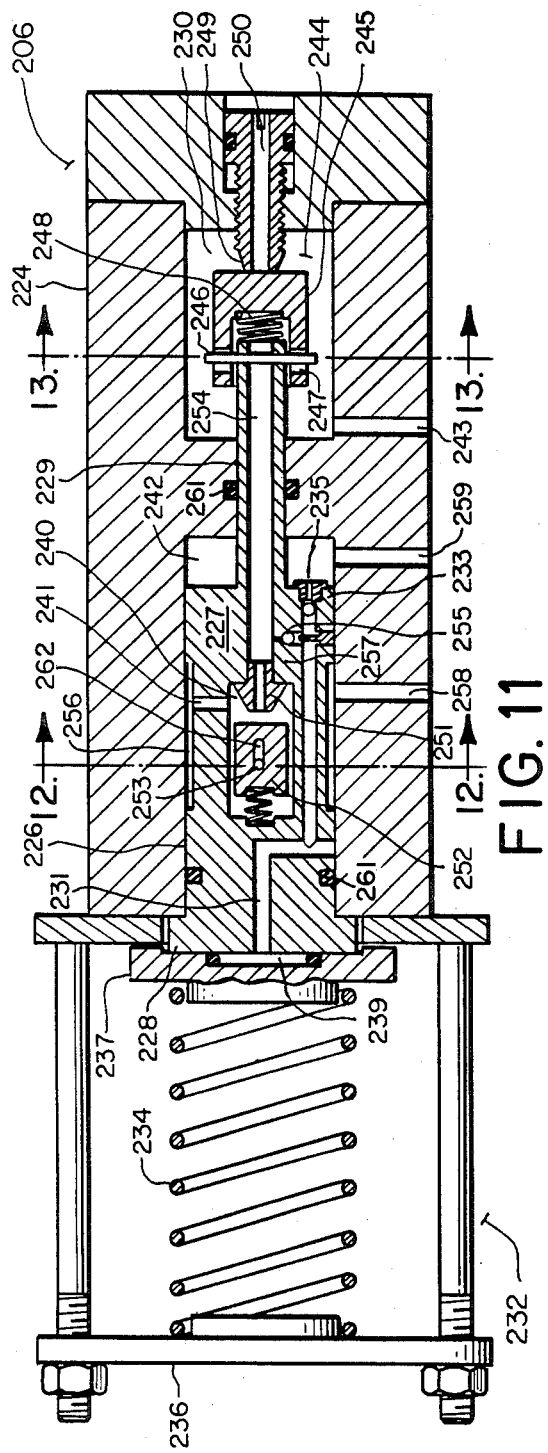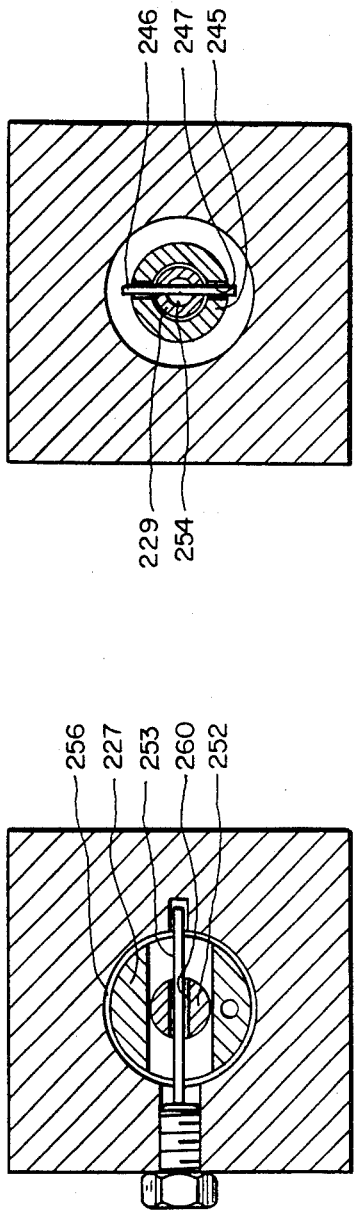

MODULATING PRESSURE OPERATED PILOT RELIEF VALVE

CROSS REFERENCE TO RELATED APPLICATIONS

This application is a continuation-in-part of my copending application Ser. No. 534,594, filed on Sept. 22, 1983 now U.S. Pat. No. 4,615,356 issued Oct. 7, 1986. The application as filed and any allowed amendments thereto are hereby incorporated by reference.

My U.S. Pat. No. 4,402,341, filed on Apr. 6, 1981, for Pilot Operated Relief Valve, is hereby also incorporated by reference.

BACKGROUND OF THE INVENTIOIN

1. Field of the Invention

The present invention relates to a new and improved modulating pilot valve for adjusting product pressure relief flow from a balanced main valve.

2. Description of the Background Art

It is desirable to secure a safety or pressure relief valve on a pressure vessel for venting product pressure that exceeds a limit above which a dangerous condition may result. A typical safety valve includes a valve member biased by a spring into engagement with a seat. If product pressure exceeds a predetermined safe level, the force against the valve exceeds the biasing force of the spring causing the valve to lift from the seat to vent product pressure. Such valves are unreliable and subject to rapid deterioration due to repeated engagement with the valve seat. Since the valve and seat are in the flow of product fluid, damage from the impinging flow also occurs. Safety valves incorporating a pilot valve have also been employed. Also valves now in use operate by continuously bleeding the product from the main valve resulting in substantial loss of product. In addition, continuous pilot fluid flow or bleed through the pilot valve increases the probability that debris entrained in the fluid may obstruct the pilot valve or freezing can occur.

A known safety valve for a pressure vessel is illustrated in U.S. Pat. No. 4,291,721. The valve disclosed in this patent does not provide modulating action, and the extended construction utilized increases the possibility of malfunction by sticking of close fitting sliding parts.

All of the existing valves as described are difficult to test, i.e. to make a field determination of pilot valve operating pressure when installed on a pressure vessel or conduit. With these valves, testing generally requires venting of a substantial volume of product fluid.

SUMMARY OF THE INVENTION

An object of the present invention is to provide a new and improved modulating, pressure actuated pilot operated relief valve.

Another object of the present invention is to provide a new and improved modulating pressure actuated pilot operated relief valve that relieves excess product pressure in a vessel by venting pressurized head volume above a balanced main valve member in proportion to the excess without allowing continuous flow through the pilot.

A further object of the present invention is to provide a new and improved pressure actuated pilot operated relief valve that includes a field test valve allowing testing of the pilot valve without venting of product pressure or disassembly of the valve.

It is an additional object of the present invention to provide a new and improved pilot for operating a main valve in pressure relief having secondary or backup operation in case of pilot valve failure, wherein the backup relief or overpressure protection device is automatically set to a predetermined operating pressure by initial adjustment of the pilot valve set point.

Briefly, the present invention is directed to a new and improved pressure actuated pilot operated relief valve for continuous modulation of the flow of product pressure from a vessel. The pilot valve communicates with a balanced main valve that includes a movable closure member and a pressurized head volume above the closure member. The pilot valve includes a pilot piston chamber and a differential pilot piston reciprocally mounted within the chamber. The chamber is in fluid communication with the pressure in the head volume that acts on the pilot piston to bias the piston in a selected direction due to the differential area of the piston. Product pressure is communicated to an inlet valve that is actuated by the pilot piston to allow flow of product pressure into the chamber. The pilot piston chamber is communicated to the outlet of the main valve through a vent valve that is actuable by the pilot piston.

A field test valve is included with an inlet to which test pressure may be applied. A first outlet is defined in the field test valve in fluid communication with the field test inlet. A poppet valve is mounted between the first inlet and the first outlet to control flow of fluid therebetween. A vent orifice is included with flow therethrough controlled by the poppet valve. The field test valve includes a second outlet in fluid communication with the field test inlet and with product pressure. A shuttle valve is positioned between the second outlet and the field test inlet to control fluid therethrough. The pilot piston includes a head member loaded by the same spring as the pilot piston but is free to move independently and open the main valve providing backup relief.

An alternate embodiment incorporates an operating pilot valve piston disposed intermediate of and coaxially with a relief pressure calibration spring and a pressure sensing surface at its opposite end. Coaxially displaced from the pressure sensitive end is a piston extension projecting into an adjacent pressurized chamber containing a poppet type exhaust valve. The piston pressure sensing end and valve body bore define a first valve chamber in pressure communication with the product pressure vessel or conduit. The valve pressure sensing chamber communicates through a passage internal of the operating piston, with a secondary relief system.

The secondary relief system includes a secondary pressure sensing chamber defined by the piston head, and relief calibration spring adapter. The piston pressure head and spring adapter are in sealing engagement, thereby defining said secondary pressure sensing volume. In the event that the pilot malfunctions so as not to open the main valve at the set point, the valve spring adapter and piston head separate at a predetermined product pressure somewhat in excess of the initial pressure relief valve spring setting.

Normal piston operation involves pressurizing the first pressure sensing chamber and communicating the piston internal valve chamber via ports in the valve body. An additional port communicating the exhaust valve chamber with the main valve head volume provides product pressure equal to that exerted on the main valve piston lower surface, thereby maintaining the main valve piston in its closed or non-venting position.

At a relief pressure established by forces exerted on the pilot piston head end by its calibrating spring, movement of the operating piston against the spring results in initial isolation of the piston internal chamber. Further increases in tank pressure operate the exhaust poppet valve contained in the exhaust chamber, reducing pressure in that chamber. Unbalanced forces due to reduction of pressure in the exhaust valve chamber, acting on the extension rod internal of the exhaust chamber, result in pilot piston motion opposite to that produced by increased pressure in the primary sensing chamber. Reduced exhaust valve chamber pressure results in slightly unbalancing the main valve piston, thereby initiating controlled or proportional relief of product through the main valve.

Additional product pressure increases felt in cyclic operating of the pilot piston is described above, and further lifting of the main valve piston with increased product venting.

On the occasion of sufficient product pressure increases, the main valve piston obtains a fully open position.

BRIEF DESCRIPTION OF THE DRAWINGS

The above and other objects and advantages and novel features of the present invention will become apparent from the following detailed description of the preferred embodiment of the invention illustrated in the accompanying drawings wherein:

FIG. 1—1 Prime is a section through the pilot valve of FIG. 1 particularly showing the differential pressure area of the operating piston of the modulating version of the pilot valve of the invention.

FIG. 2—2 Prime is a section view of the pilot valve of FIG. 2 particularly showing the differential pressure areas on the piston of the "pop" or instantaneously operating version of the pilot valve of the invention.

FIG. 8 is a section along lines 8—8 of FIG. 7, particularly showing shape and positioning of pilot internal poppet valves.

FIG. 9 is a section taken along lines 8—8 of FIG. 7, particularly showing the relationship of the internal poppet valves and operating piston.

FIG. 11 is an enlarged section of the pilot valve portion of FIG. 10, particularly showing construction of the exhaust and inlet valves.

FIG. 12 is a section of FIG. 11, along the lines 12—12.

FIG. 13 is a further section of FIG. 11, along the lines 13—13.

DESCRIPTION OF THE PREFERRED EMBODIMENT

Figure 1:
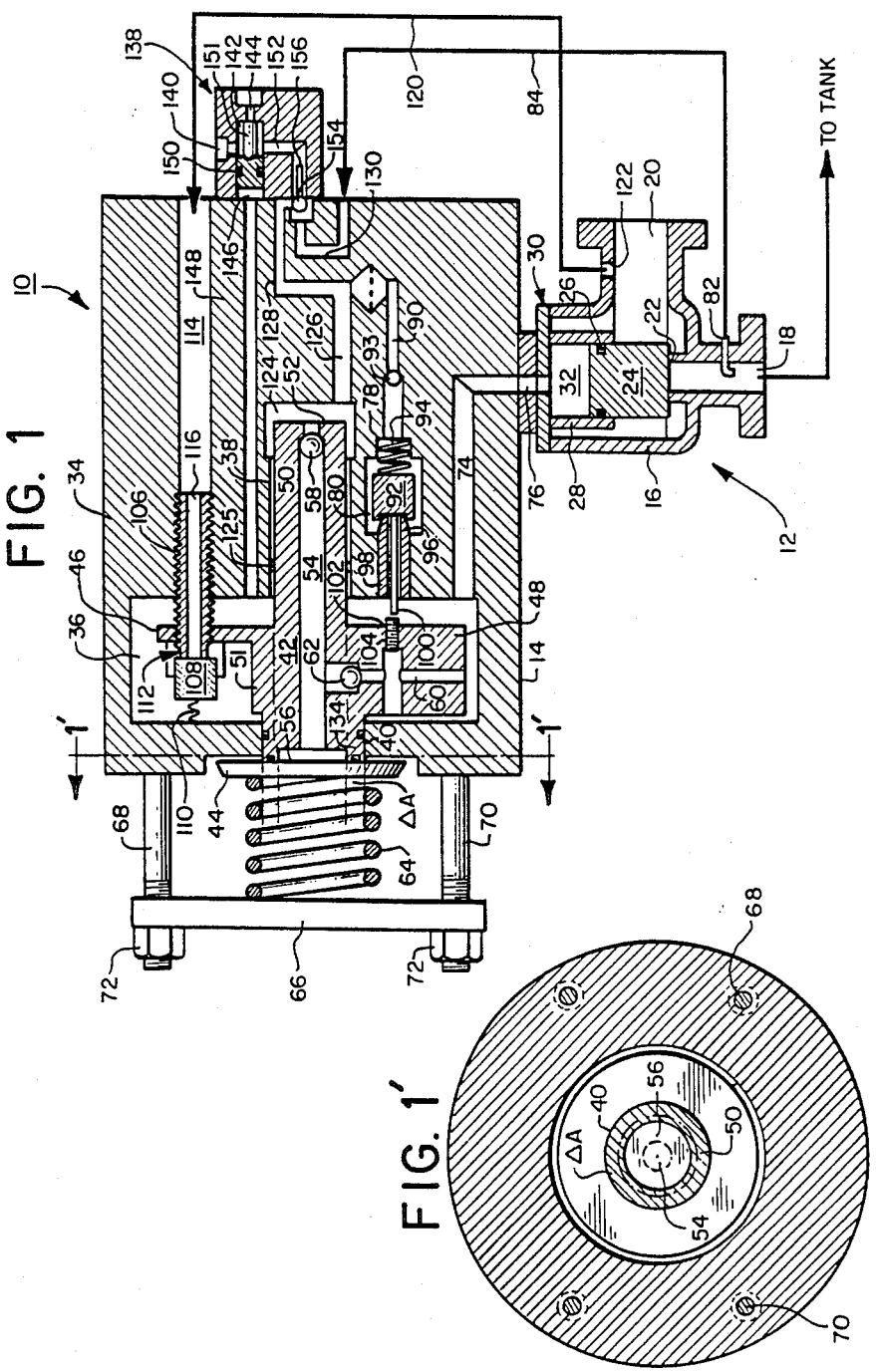
FIG. 1 is a schematic illustration of a modulating, pressure actuated pilot operated relief valve constructed in accordance with the principles of the present invention.

Referring to FIG. 1, there is illustrated a valve assembly generally designated by the reference numeral 10. The valve assembly 10 includes a main valve generally designated by the reference numeral 12 and a pressure operated pilot relief valve generally designated by the reference numeral 14. The pilot valve 14 controls the main valve 12 for modulating proportional venting of product pressure from a pressure vessel.

The main valve 12 includes a body 16 with an inlet 18 that is in fluid communication with a pressure vessel (not shown) containing product fluid under pressure. The main valve 12 also includes an outlet 20 for venting product pressure to the atmosphere or to an overflow vessel. Between the inlet 18 and outlet 20 of the main valve 12 there is a valve seat 22 on which is seated, in the closed position, a movable valve closure member 24. The closure member 24 includes a seal 26 in engagement with a chamber wall 28 extending down from a top 30 of the main valve 12. The seal 26 allows reciprocal movement of the closure element 24 relative to the seat 22. A main head volume 32 is defined within the chamber wall 28 and above the closure element 24 into engagement with the seat 22. If the pressure in the main head volume 32 is substantially less than product pressure, the product pressure in inlet 18 moves the closure element 24 upward allowing product to flow from the inlet 18 through the outlet 20.

The pilot valve 14 includes a body 34 defining an enlarged chamber 36 and a reduced diameter chamber 38. An aperture 40 is fabricated in the body 34 through which extends a differential area pilot piston 42 that includes a head 44, a first transverse surface 46, a second transverse surface 48 and a reduced body portion 50 with an end 52. A spring 64 provides pressure opposing or calibration force to the head 44 and piston 42. Varying the compression of spring 64 through the use of adjusting members 70, 66, 68, and 72, allows setting the pressure relief level or pressure value which when admitting to the chamber 124, causes the piston 42 to move to the left (ref. FIG. 1.)

The reduced body portion 50 extends from end 52 to a first side of the surfaces 46 and 48. The pilot valve 10 includes a reduced diameter chamber 124. A seal 125 isolates chamber 124 from chamber 36. Piston 42 extends through bore 40 to the outside and through the bore 38 to chamber 124.

In the modulating version of the valve 10 illustrated in FIG. 1 and FIG. 1—1 Prime, the bore 40 is of a larger diameter than bore 38 with the result that the pressure in chamber 36 acts on an annular additional net effective area delta A producing a leftward force opposing the force of spring 64. Delta A is also the difference between the cross sectional area of end 52 (equal to approximately the cross sectional area of bore 38) and the cross sectional area of the piston 42 where it passes through the bore 40. The difference between the cross sectional areas of the right and left sides of surfaces 46 and 48 is also equal to delta A, as shown in FIG. 1—1 Prime.

An elongated passage 54 extends the length of the pilot piston 42 to an enlarged void or open area 56 behind the head 44. A back flow preventer or check valve 58 is positioned within the passage 54 to control back flow therethrough. A second passage 60 extends perpendicular to and is in communication with the passage 54 and the chamber 36. A back flow preventer or check valve 62 is positioned within the passage 60 to prevent back flow into the chamber 36 and to maintain product pressure in chamber 54. The piston 42 is biased by a spring 64 positioned between head 44 and a spring plate 66 mounted on threaded supports 68 and 70. The plate 66 is held on the threaded posts 68 and 70 by nuts 72 that adjust the position of the plate 66 and the biasing force of spring 64.

Pressure within the head volume 32 is controlled or modulated by the pilot valve 10 by communicating the pressure in the head volume 32 to the chamber 36 by valve passage 74 and an interconnecting conduit 76. Pilot piston 42 actuates two additional valves to control the fluid pressure within chamber 36. The first valve is an inlet valve generally designated by the reference numeral 78. Inlet valve 78 includes a chamber 80 in communication with product pressure through: a ram tube 82 in the inlet 18 of the main valve 12, a conduit 84, passages 130, 128, 90, and a back flow check valve 93. The back flow check valve 93 is positioned within the discharge passage 90 of the inlet valve 78 so as to prevent flow through 90 when the pressure in chamber 80 exceeds that of passage 90. Inlet valve 78 also includes a valve member 92 that is biased by a spring 94 into engagement with a seat 96. The seat 96 includes a passage 98 extending between chambers 80 and 36. A valve cam 100 extends through the passage 98 and abuts the valve member 92. An adjustable cam actuator 102 is threadably mounted within a threaded aperture 104 in the extending portion 48 of the pilot piston 42. By threading actuator 102, the point of engagement with cam 100 can be adjusted to vary the point at which the valve member 92 is lifted off of the seat 96 by the actuator 100.

The second valve included in the pilot valve 10 is a vent valve generally designated by the reference numeral 106. Vent valve 106 includes a valve member 108 mounted within chamber 36 and biased by a spring 110 into engagement with a seat 112. The seat 112 is threadably mounted within and at one end of bore or passage 114. Seat 112 includes an axial or elongated passage 116. The seat 112 also extends through surface extension 46 of the pilot piston 42. Passage 114 is in fluid communication with outlet 20 of main valve 12 by a conduit 120 that is in fluid communication with an aperture 122 in the outlet 20. Upon engagement of the piston surface or extension 46 with valve member 108, member 108 is unseated and pressure within chamber 36 vents along passage 114, conduit 120, port 122, and through outlet 20.

Figure 2:
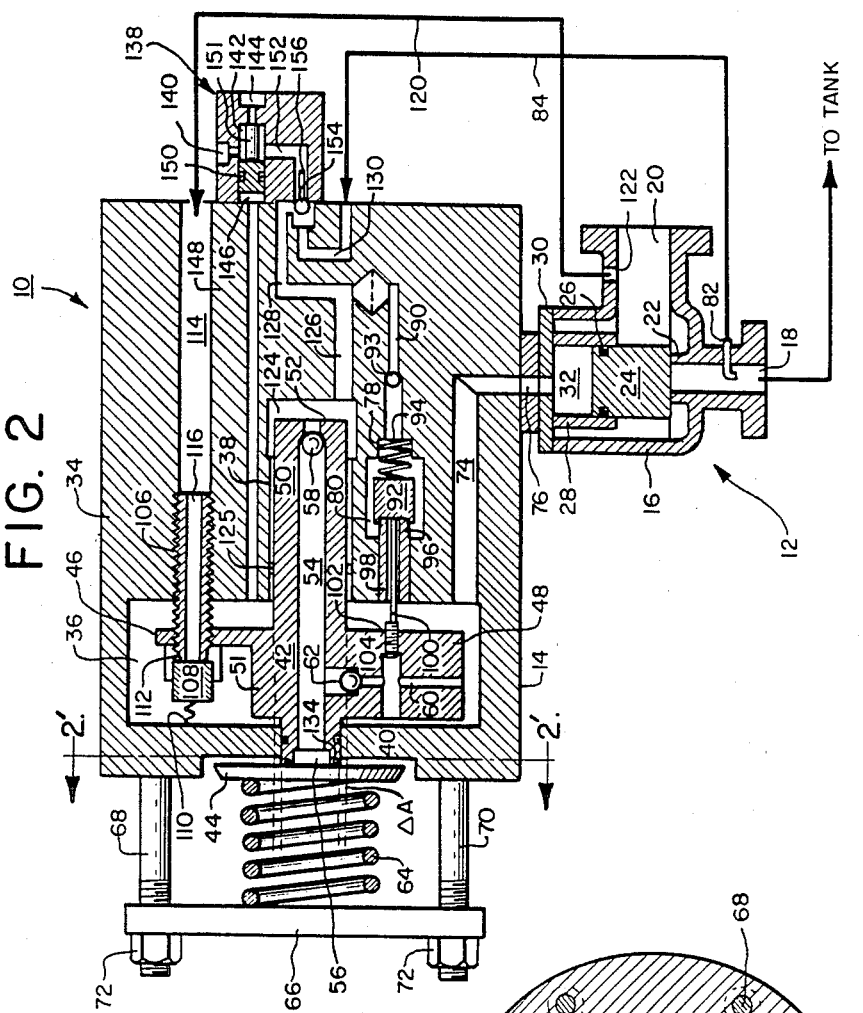
FIG. 2 is a schematic illustration similar to FIG. 1 of an alternative embodiment of a pop or rapidly acting full discharge pilot operated relief valve.
Figure 2:
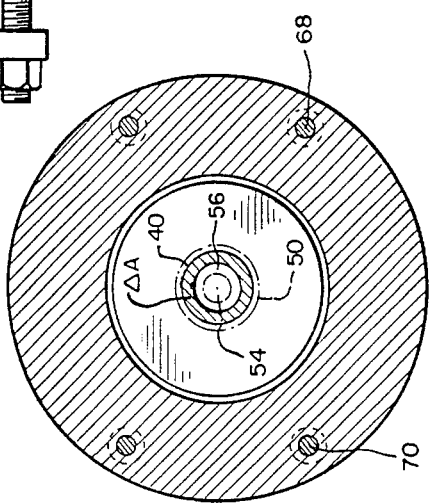
Figure 3:
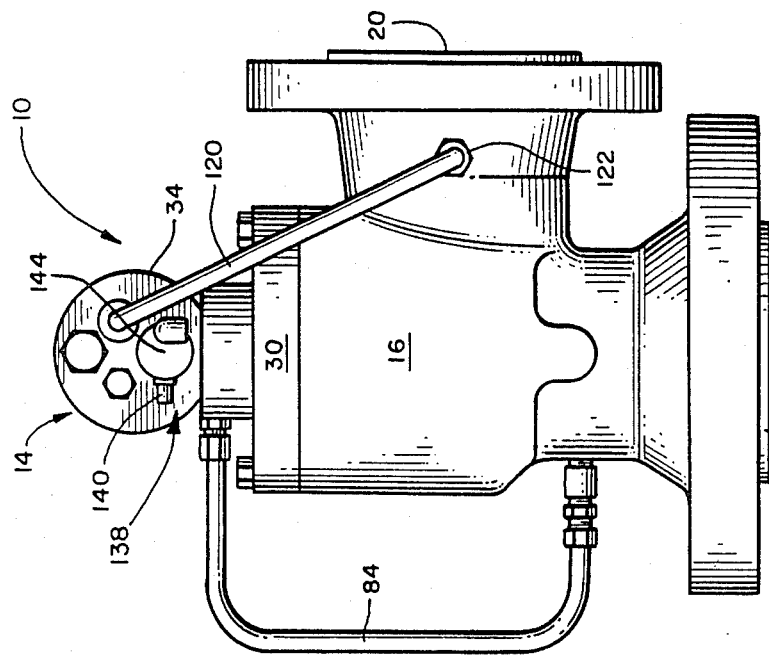
FIG. 3 is a plan or side view of the pilot valve of the invention particularly showing interconnecting conduits between the pilot main valve, and field test valve.
Figure 4:
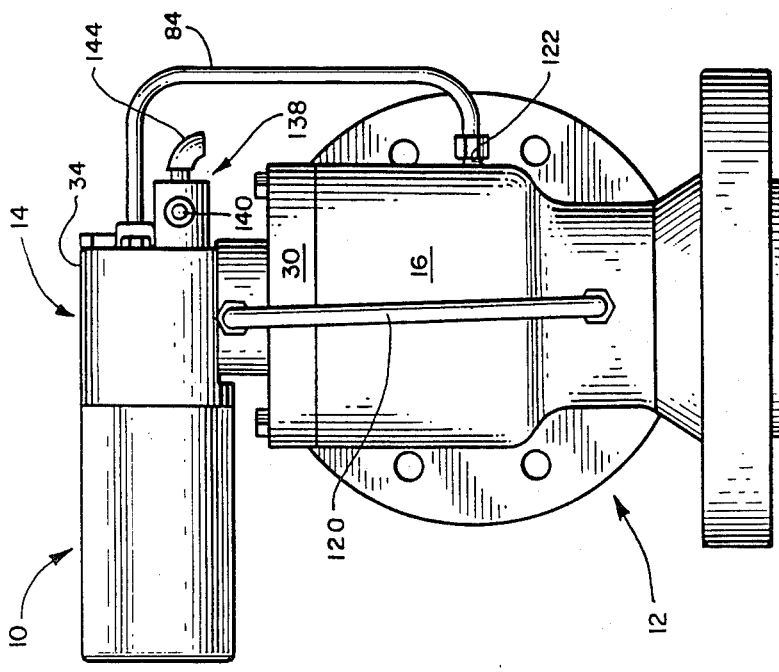
FIG. 4 is an additional plan or side view similar to FIG. 3.
Figure 5:
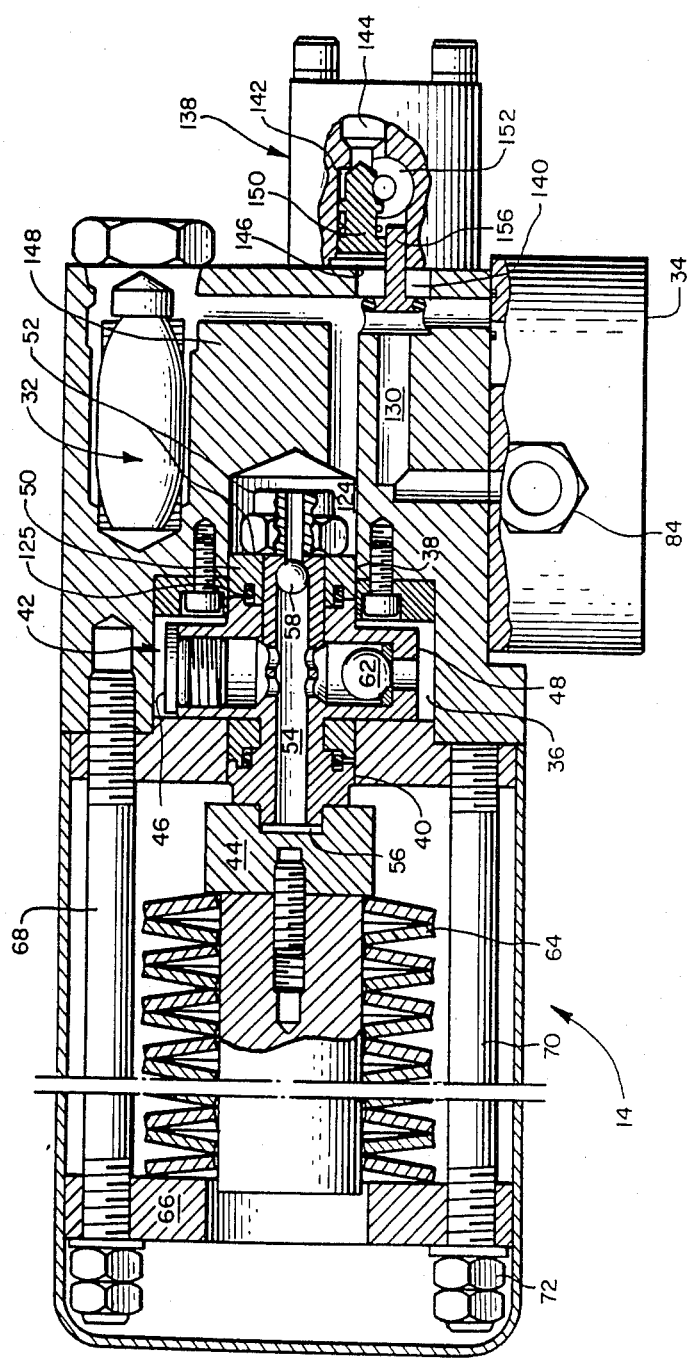
FIG. 5 is a section view of a commercial embodiment of the pilot valve of the invention along the lines 5—5 of FIG. 6, essentially showing functional elements of the valve depicted in FIGS. 1, 1—1 Prime, 2, and 2—2 Prime.
Figure 6:
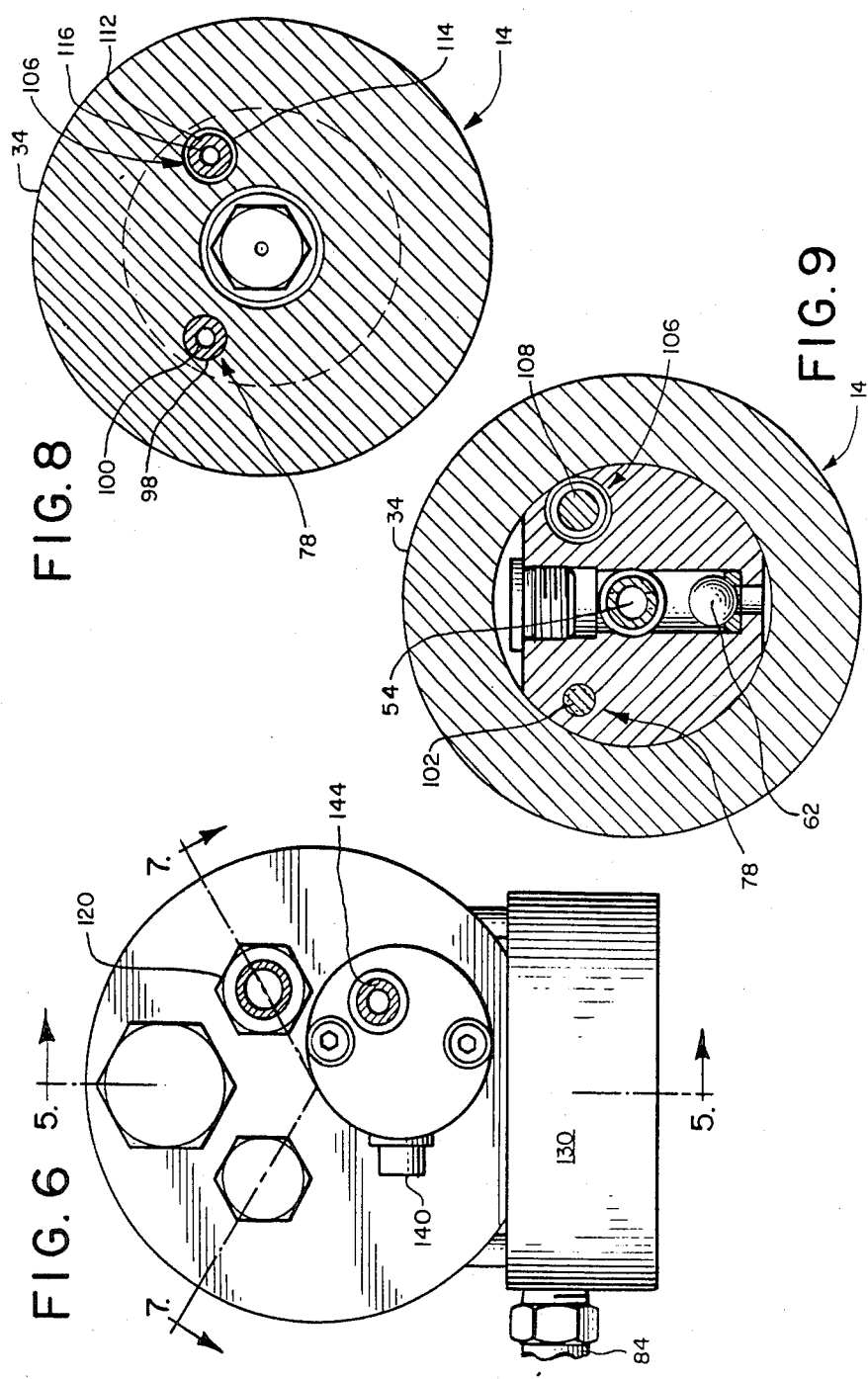
FIG. 6 is an end view of a commercial embodiment of the pilot valve of the invention.
Figure 7:
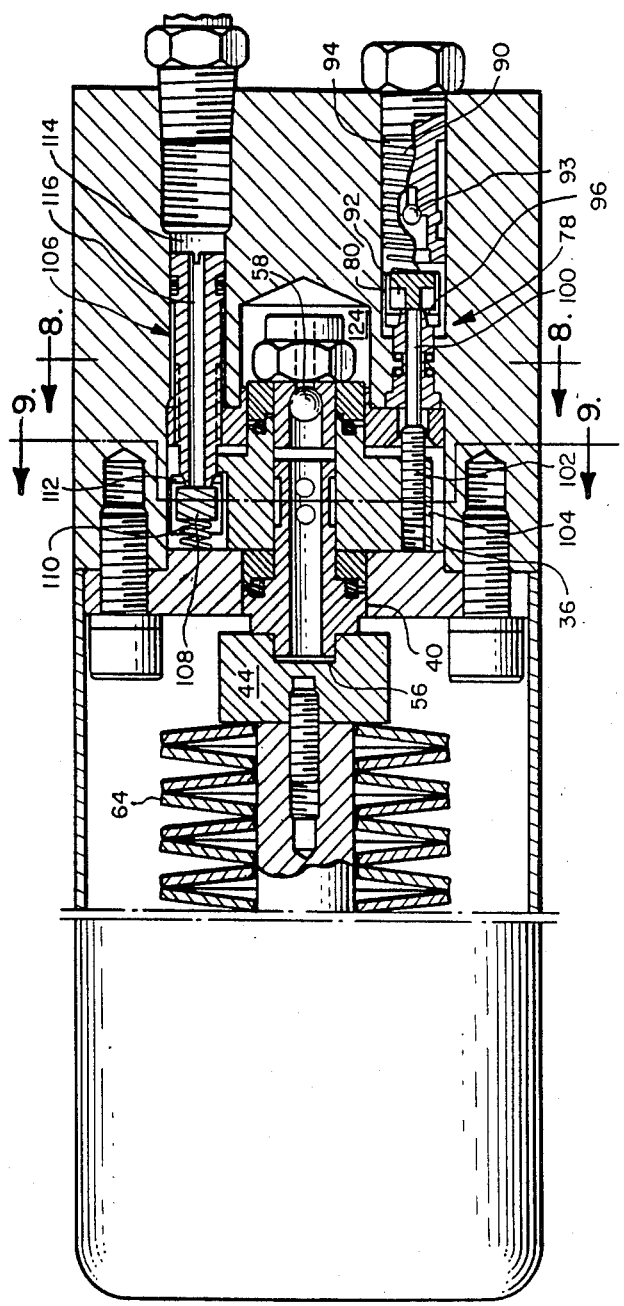
FIG. 7 is a semi-sectional view of a commercial embodiment of the valve described in FIGS. 1 and 2, taken along the lines 7—7 of FIG. 6.

Forces counterbalancing the biasing force of the pressure calibrating spring 64 are provided by the net force developed by pressure in chamber 36 acting against the effective area delta A, and product pressure in chamber 124 acting against end 52 of piston 42. It should be noted that if delta A represents the increased effective pressure sensing area of piston 42 within the chamber 36 over the area of surface 52, this force will oppose spring 64 (ref. FIG. 1—1 Prime). If delta A represents the net effective decrease of the effective pressure sensing area of piston 42 within chamber 36, with respect to the area of surface 52, this force will aid the force of spring 64 (ref. FIG. 2—2 Prime).

Chamber 124 is in fluid communication with inlet 18 of the main valve 12 by passages 126, 128, 130, and on the enlarged void or area 56. As a safety precaution, structure is provided for emergency venting of product pressure if pilot valve 14 fails while preventing relief of head volume 32. If the pilot piston 42 were constructed in its movement at its preset pressure, back flow preventer 58 would open and product pressure entering chamber 124 would flow along the passage 54 into the area 56. Check valve 62 prevents venting of the product pressure within passage 54 into the chamber 36. A seal 134 encircles area 56. As area 56 may be up to 10% smaller than the area of bore 40, before pressure has risen to 10% over set point, head 44 separates from piston 42 allowing pressure to act against the entire area of head 44, which is much larger than area 56, causing further lift and full opening of passage 54. Pressure in chamber 32 is then vented through passages 74 and 60 into chamber 36, across check valve 62, past head 44 to the atmosphere. Piston 24 then lifts, venting the overpressure through outlet 20 in the usual manner. Valve 62 functions as a check valve so the pressure in chamber 32 is not replenished by inlet pressure from chamber 124 via passage 54. Adjustment of the force in spring 64 determines both the set point of the pilot and the relief pop off pressure of this emergency backup device.

In operation, with the modulating version of FIG. 1, and FIG. 1—1 Prime, the main valve 12 is initially balanced with valve closure member 24 on seat 22 and inlet valve 78 and vent valve 106 closed. As product pressure in the inlet 18 increases, pressure is communicated from the inlet 18 of the main valve 12 to end 52 of the pilot piston 42. Once product pressure increases to a preselected level, pilot piston 42, biased by pressure in chamber 36 and 124, moves against the spring 64. This movement results first in allowing valve member 92 to close against seat 96 cutting off pressure supply to chamber 36 and then results in engagement of portion 46 of pilot piston 42 against valve member 108 lifting it off seat 112 and allowing pressure within chamber 36 to vent through vent valve 106 to outlet 20 of the main valve 12. Pressure in head volume 32 is also vented reducing the pressure acting on the effective pressure sensing area delta A (ref. FIG. 1—1 Prime) thereby reducing the force acting against spring 64 which had moved the differential piston leftward. The force of spring 64 is then sufficient to move pilot piston 42 toward its original position closing vent valve 106. During this cycle, the reduction in pressure in chamber 36 and 32 allows the main valve closure member 24 to lift slightly off seat 22 allowing product to flow from inlet 18 through outlet 20; however, no product flows through pilot valve 14. If closure member 24 is not lifted a sufficient amount to vent product pressure, and product pressure continues to rise, the cycling of the pilot piston 42 is repeated. This corresponds to a non-bleed operation and provides modulating or proportional venting of product pressure.

With product pressure below the pilot set point pressure, spring 64 moves pilot piston 42 moving actuator 102 into engagement with the valve cam 100. Cam 200 lifts inlet valve member 92 off seat 96 allowing product pressure into chamber 36. The increased pressure in chamber 36 increase the net force acting on the effective pressure sensing area delta A to move actuator 102 off cam 100 closing inlet valve 78. The increased pressure in chamber 36 is communicated to head volume 32 biasing closure element 24 slightly downward 22 to reduce flow through the inlet 18 and outlet 20 of the main valve 12. If the flow is not sufficiently reduced, the cycle is repeated.

During either of the described cycles, only product pressure in the head volume 32 is vented. A large volume of product does not flow through the pilot valve 14 and continuous venting of product pressure does not occur thereby avoiding the flow of contaminants into the pilot valve 14 that could damage or impede operation.

A position intermediate of the described positions of pilot piston 42 is illustrated in FIG. 1. In the intermediate position, inlet valve 80 and vent valve 106 are closed resulting in a stabilizing dead band that isolates the pressure in the head volume 32 and the product pressure providing improved control of main valve closure element 24 in proportional relief operation.

Valve assembly 10 also includes a field test limit valve generally designated by the reference numeral 138. Field test valve 138 includes an inlet 140 into which is introduced test pressure. A chamber 142 is defined within the field test valve 138 an is in fluid communication with inlet 140 and a vent 144. An outlet 146 in chamber 142 communicates with a passage 148 extending into chamber 36. This communication allows a poppet valve 150 to sense pressure in head volume 32. The poppet valve 150 with an extension 151 is reciprocally mounted within the chamber between the outlet 146, the inlet 140 and vent 144. Chamber 142 is also in communication with a passage 152 that includes an outlet 154 in communication with passage 130. A shuttle valve 156 is positioned within the outlet 154.

The extension 151 on the poppet valve 150 can be sealed against vent 144 as illustrated if pressure in the volume 32 and chamber 36 is greater than atmospheric pressure. While the poppet valve 50 is in this position, shuttle valve 156 senses field test fluid pressure introduced into the inlet 140 and product pressure in passage 130. To test the pilot valve 14, field test pressure is introduced into inlet 140. If the test pressure is less than the pressure in volume 32, shuttle valve 156 is seated in outlet 154 and the poppet valve 150 is seated in vent 144 to retain head pressure in volume 32 and the pressure in chamber 36 near product pressure. As test pressure is increased and approaches product pressure, shuttle valve 156 is lifted from the outlet 154 to isolate the field test valve 138 from product pressure. Field test pressure may then enter chamber 36 by way of the inlet valve 78 since the differential piston 42 is below set relief pressure and moved to the right of its position shown on FIG. 1, wherein inlet valve cam 100 and actuator 102 open valve member 92, admitting test fluid at test pressure to chamber 36, and elevating head pressure in volume 32 to field test pressure. As field test pressure continues to increase and approach the set point pressure, the pilot piston 42 moves to the left (ref. FIG. 1) to close the inlet valve 78 and open the vent valve 106 allowing the head pressure within volume 32 to drop. As the head pressure drops to approximately 80% of the field test pressure being introduced into inlet 140, poppet valve 150 moves off the vent 144 venting the field test pressure to atmosphere. The 80% figure is dependent on effective pressure areas of poppet 150, other values could be incorporated as well. The pilot piston 42 then returns to its original position closing the inlet valve and raising pressure in the head volume 32 prior to the main valve 12 opening. The field test limit valve 138 allows an inspector to check the operation of the pilot valve 14 without main valve operation, but if the main valve operation is desired, vent 144 may be plugged or otherwise obstructed.

If pressure in the main valve outlet 20 exceeds pressure in its inlet 18, piston or closure element 24 due to effective pressure areas adjacent the seat 22 will lift allowing backflow from the outlet 20 to the inlet 18 into the tank unless the inlet pressure that the pilot usually communicates the chamber 32 is replaced by the higher outlet pressure. Under these conditions, pressure in outlet 20 flows back through outlet port 122, passages 120 and 114, lifts poppet 108, flows through chamber 36 and passage 74 into chamber 32 while check valves 93 and 58 prevent the higher pressure in chamber 36 from flowing back to the tank through inlet 84.

A "pop" or rapidly acting, full discharge pilot operated relief valve designated 10' is illustrated in FIGS. 2 and 2—2 Prime. The pop valve 10' is substantially the same as the modulating valve 20 and identical components of pop valve 10' are designated by the same reference numeral as in FIG. 1 whereas different components are designated by the same reference numeral and a prime. The differential area delta A' in the pop valve 10' is the reverse of the modulating valve 10 since the bore 40' is of a smaller diameter than bore 38 with the result that the pressure in chamber 36 acting on differential area delta A' produces a net rightward force. This force then aids the force of spring 64 and opposes the force due to tank pressure on area 52. As the tank pressure rises to setpoint, piston 42 moves left acting to reduce pressure in chamber 36 which reduces the rightward force due to this pressure on area delta A' permitting further left motion of piston 42. This regenerative or positive feedback action quickly drives piston 42 full left venting all pressure from chamber 32 fully opening main valve 12. This action of the valve 10' is described as a "pop" action or rapid acting, full discharge action.

DESCRIPTION OF THE ALTERNATE EMBODIMENT

Figures 10, 14:
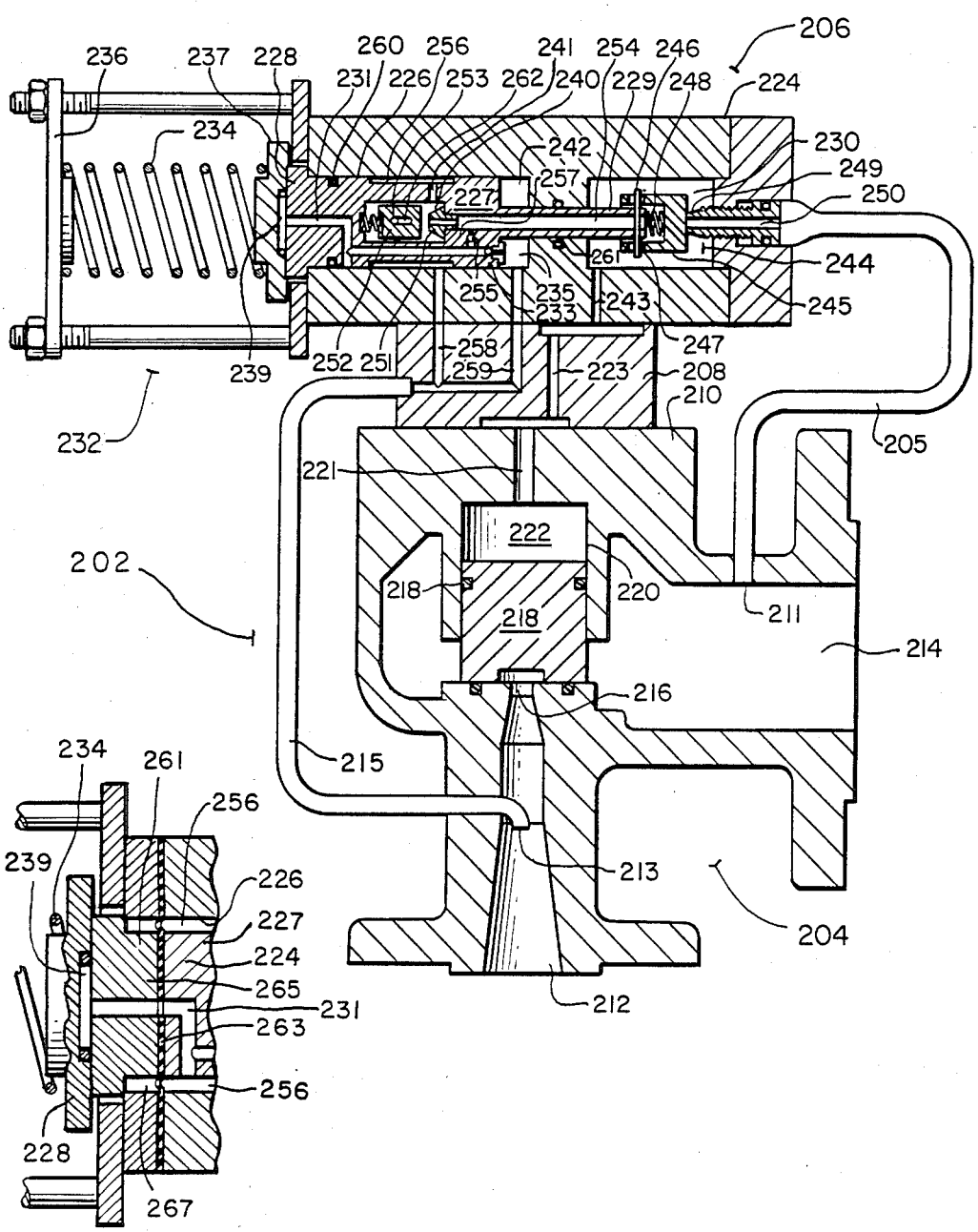
FIG. 10 is a sectional somewhat schematic view of the alternate embodiment of the disclosed invention, particularly showing the alternate pilot valve/main valve assembly and interconnecting conduits.
FIG. 14 is a partial section of the pilot valve of FIG. 11, particularly showing an alternate construction using a diaphragm seal between the pilot valve piston and body.

With reference to FIG. 10, an alternate embodiment of the pilot operated relief valve assembly 202 comprises a main valve 204, in cooperating assembly with a pressure operated pilot valve 206, via an adapter 208, having internal fluid communicating passages 223, 258, and 259. A pressure sensitive tube 215 interconnects a ram or pressure sensing tube 213, located in the internal passage 216 of main valve 204, upwardly adjacent to the main valve inlet 212.

Main valve assembly 204 is of the pressure balanced type, comprising a valve body 210, a product pressure inlet 212, and an exhaust or product pressure relief outlet 214. Intermediate of said inlet and outlet is a piston type closure member 218 reciprocating in a cylinder 220 contained in the valve body 210. In its closed or nonventing position, the piston 218 is in sealing cooperation with a main valve seat 216. The opposite end and main valve cylinder 220 define a main valve head volume 222, in pressure communication with passage 223 of adapter 208 via conduit 221.

Additional conduit 205 communicates a pressure tap 211 in main valve outlet 214 with the exhaust valve outlet 250 of the pilot valve assembly 206.

The pilot assembly 206 further comprises an internal cylinder bore 226, and first pressure sensing chamber 242 internal of the pilot valve body 224. The pilot valve body 224 further defines an internal exhaust valve chamber 230 containing the pilot exhaust valve assembly 244. The pilot valve housing 224 further defines a cylinder bore 226 containing a pilot valve piston assembly 227, having a piston head 228 and an oppositely disposed projecting piston rod 229. The piston rod 229 extends into the exhaust chamber and intermediate pressure seal arranged to allow reciprocal motion of the rod relative to the adjacent rod guide portion 225 of the pilot valve housing 224. Moving seals 260 and 261 maintain product pressure diferences between the atmosphere and chambers 252, and 230, respectively. Although typical resilient seals such as "O" rings are shown, those skilled in the sealing art will readily understand that the relatively small piston travel would allow use of diaphragm seals as well.

With particular reference to FIG. 14, there is shown an alternate seal construction of the disclosed pilot valve of FIG. 10. As indicated above the O-ring seal 260 is now replaced by a flexible diaphragm 263 allowing reciprocal motion of the piston 227 in the body bore 226. With this construction the piston head 265 and the pilot piston assembly 227 contain or sandwich the diaphragm 263 to form a pressure seal between the now extended pilot system annular clearance or port 256 defining a valve body clearance space 267, and the annular pilot piston head 265. Similarly the outer or peripheral portion of the diaphragm 263 is contained between the valve body 224, and an annular diaphragm seal collar 261. Other portions of the disclosed pilot construction remain as shown on FIG. 10. Internal of the piston rod is an internal passage 255 pressure communicating the exhaust chamber 230 with an inlet valve chamber 240 internal of said pilot piston 227. Also contained in the chamber 240 is the inlet poppet seat 252, and inlet valve poppet 251. The pilot piston assembly 227 and cylinder bore 226 define a first product pressure sensing chamber 242, in pressure communication with product pressure via ports 259, and pressure distributing tube 215. The pilot piston 227 further comprises a check valve assembly and orifice 233 and 235, respectively, and a secondary pressure sensing chamber 239, pressure communicated by internal piston passage 231. The passage 231 is in further pressure communication with valve rod port 235 via internal piston axial passage 254, and associated check valve 257. Operation of check valves 257 and 233 will be described later.

The secondary pressure sensing chamber 239 is defined by the pilot valve spring adapter 237 and the pilot valve piston head 228 as shown in sealing engagement.

The secondary pressure sensing chamber 239 is in fluid communication with a primary pressure sensing chamber 242 via an extension of passage 231, and the orifice check valve combination 233 and 235.

The exhaust chamber 230 contains an exhaust valve assembly 244 comprising exhaust valve seat 245 and exhaust valve poppet 249. The poppet and seat are maintained in sealing engagement by exhaust valve spring 248, contained on the open end of the pilot piston rod 229 by a retaining pin 246. The exhaust valve seat 245 engages pin 246 in an elongated or slotted hole 247 providing relative axial motion between the piston extension 229 and poppet seat 245. Similarly, the inlet valve poppet seat 252 is slidingly engaged internal of the piston 227 by a pin 253, contained in a slotted hole 262. This arrangement provides for relative motion between the inlet valve seat 252 and pilot valve piston 227. The significance of this movement will be fully described later.

A valve pressure calibration spring 234 is mounted above and axially with the pilot piston head 228 in order to exert a predetermined force on the pilot piston assembly 227. The spring 234 is retained at its opposite end by spring keeper 236, retained by tension members 232.

In operation, assuming as indicated in FIGS. 10 and 11, a product pressure below the pilot relief setting is produced by precompression of spring 234, product pressure enters chamber 242 via tube 215, and passage 259 as shown. Product pressure also enters chamber 240 via passages 258 and 215, also as shown. Due to the incorporation of a peripheral passage 256, defined by reduced portions of the piston 227 and cylinder wall 226, and a radial piston passage 241, the chamber 240 is in fluid and axial passage 254. Product pressure is further exerted on the head of the main valve 218 via passages 243, 223, and 221.

Under these conditions, the main valve piston 218 is retained in its seated position as shown.

On an increase in product pressure transmitted via sensing orifice 213 and tube 215, the pressure of product in chamber 242 exerts a force on the adjacent area of piston 227, in opposition to the spring force exerted on the head end 228 of piston 227 by spring 234. When this force exceeds the predetermined spring preload, piston 227 moves against spring 234 and is thereby displaced leftward as shown in FIG. 10. On sufficient movement against spring 234, valve poppet 252 and seat 251 are engaged, thereby pressure sealing the exhaust chamber 230 from product pressure via port 258. Further increase in product pressure in chamber 242 moves the piston 227 additionally leftward until the slotted distance of 247 is exceeded, thereby lifting exhaust valve poppet 245 from exhaust valve seat 249. Opening of the exhaust valve 244 allows an initial amount of the product pressure contained in head volume 222 to exit via passage 250 and tube 205, and pressure tap 211. The reduction in product pressure in chamber 230 results in an overall reduction of force on the associated pressure sensitive areas of the end of rod 229. This force reduction acts to aid the force exerted on the piston head 228 by spring 234, and returns piston 227 to its null position, where both valves are closed, preventing any further product flow in or out of piston head volume 222.

On further product pressure rise, this sequence of events is repeated until the pressure reduction in volume 222 above main valve piston 218 allows the piston 218 to rise slightly, providing product relief via main valve inlet 212, main valve seat 216, and main valve exit tube 214. As those skilled in the art will readily understand, continued product pressure increase will result in continued reduction of product pressure in head volume 222 and increased lifting of main valve piston 218. Typically, initial movement of the pilot piston 227 occurs at approximately 97% of a predetermined set point. Continuing increase in product pressure to 98% of the set point results in a reduction of main valve head pressure, i.e. 222, of approximately 20%. Further increase in product pressure to 100% of a predetermined set point reduces the pressure in the main valve head volume 222 to approximately 50% of the pressure sensed at pressure sensing tube 213. The process continues until, at 101% of the predetermined set point, the main valve head pressure volume is somewhat less than 50% of the sensed product pressure, and movement of the piston 218 is initiated. This movement is now proportional to sensed product pressure until, at approximately 103% of the predetermined relief set point, the main valve piston 218 has moved to its maximum lift or relief position.

It should be noted that throughout this product pressure relief is essentially proportional to sensed product pressure at the pressure sensing location 213 and, most importantly, the volume released is limited to the volume contained in main valve head volume 222 and associated passages, including pilot valve chamber 230.

As in the preferred embodiment, secondary pressure relief in the event of failure of the operating piston 226 to move or for other reasons, is provided by the secondary pressure sensing volume 239. In the event of inadequate relief of product pressure through the operation of main valve 204, increasing product pressure after reaching a predetermined value, typically 10% higher than the pilot piston setting, results in disengaging the valve calibration spring keeper 237 from the pilot valve head 228. Loss of pressure from the chamber 239 results in product flow via conduit 215, 259, and 231. However, the associated orifice 235 limits the amount of product flow. The significance of this will be discussed later. The initiation of product flow from the secondary pressure sensing chamber 239 by disassocation, further results in product flow from the main valve head volume 222 via conduits 221, 223, 243, and the passage 254 internal of the pilot valve extension 229 enters conduit 231 via the now open check valve 255 and 257. The flow limiting characteristics of the orifice 235 prevent repressurization of the main valve head volume 222, and further make possible rapid venting of the head volume via the above mentioned check valve comprising a seat 257 and closure member 255. Therefore, secondary relief operation of the main valve 204 is assured in case of failure of the pilot piston 227 to operate.

Thus, there has been disclosed a pressure sensitive/main relief valve combination which provides proportional relief over a predetermined range of product pressure wherein vented product is limited to extremely small volumes associated with the internal piston of the main valve and associated pilot valve chambers. Those skilled in the art will readily recognize that the embodiments disclosed provide a substantial advance in the art of pilot operated relief valves utilizing pressure balanced piston type main valves in that vented product occurring due to over pressure is minimized through proportional rather than instantaneous venting of the associated pressurized product, and reduction of the vented product during the proportioning product to that contained in the relief valve and pilot.

Therefore, I claim:

1. A pilot valve for a main valve wherein said main valve includes a main valve body with an inlet and outlet, a valve chamber in the main valve, a main valve closure member reciprocally mounted in said chamber cooperating with one end of said valve chamber to restrict fluid flow therethrough, said main valve further including a main valve head volume defined by said chamber and said main valve closure member above said main valve closure member, said pilot valve comprising:
    a housing;
    a first bore at one end of said housing;
    a second bore distal from said first bore in said housing;
    a piston in said first bore having a head end and a pressure sensing end;
    a rod extending from said pressure sensing end into said second bore;
    a passage in said rod communicating said first and second bores;
    a chamber internal said piston, means communicating said internal chamber with said rod passage;
    a pressure calibrating spring coacting with said piston head end for establishing a predetermined relief pressure value;
    a fixed closure member mounted in said second bore;
    first valve seat means on said fixed closure member and a passage internal said seat means;
    first valve closure means in said second bore on said piston rod, and cooperating with said first valve seat means;
    second valve seat means in said piston internal chamber in fluid communication with said rod passage;
    second valve closure means in said piston internal chamber, cooperating with said second valve seat;
    first passage means in said housing communicating said chamber internal said piston with said main valve inlet;
    second passage means in said housing communicating said second bore and main valve head volume;
    wherein pressure exerted in said first bore in excess of a value determined by said pressure calibration spring acts to move said piston in said first bore actuating said first and second valve closure means so as to reduce product pressure in said main valve head volume.

2. The pilot valve set forth in claim 1 further comprising first lost motion connecting means for connecting said rod and said first valve closure means.

3. The pilot valve set forth in claim 1 further comprising means for communicating said passage internal said first valve seat means with said outlet of said main valve.

4. The pilot valve set forth in claim 1 further comprising a spring adapter between said pressure calibrating spring and said heat end of said piston, a secondary pressure sensing chamber between said spring adapter and said head end of said piston, and third passage means for communicating said secondary pressure sensing chamber and said pressure sensing end of said piston.

5. The pilot valve set forth in claim 1 further comprising fourth passage means for communicating said pressure sensing end of said piston with said inlet of said main valve body.

6. A pilot valve controlling the opening and closing of a main valve of the type having a valve body with an inlet and outlet, a valve chamber, a valve member reciprocally mounted in said chamber for movement toward and away from a seat at one end of said chamber to control fluid flow between said inlet and outlet, said valve body including a head chamber adjacent one side of said valve member opposite said seat for controlling movement of said valve member toward and away from said seat in response to the fluid pressure is said head chamber; said pilot valve comprising;

a housing including a pilot valve chamber adjacent one end and a vent valve chamber coaxially aligned with said pilot valve chamber adjacent an opposite end;
a piston reciprocally movable in said pilot valve chamber having a head end adjacent said one end of said housing and a pressure sensing end adjacent an opposite end of said piston valve chamber;
a hollow piston rod extending from said pressure sensing end of said piston into said vent valve chamber providing a fluid passage through said hollow piston rod between said piston and said vent valve chamber;
a piston chamber defined internally of said piston in communication with said fluid passage in said hollow piston rod;
a second fluid passage communicating said inlet of said main valve body with said pilot valve chamber;
a third passage communicating said vent valve chamber with said head chamber;
means for communicating said vent chamber with said outlet of said main valve body; and
a fluid control member movably secured to said hollow piston rod in said vent chamber for controlling fluid flow through said communicating means.

7. The pilot valve claimed in claim 6 further comprising a valve element in said piston chamber defined internally of said piston, means for mounting said valve element to said piston valve housing and providing a lost motion connection, and a valve seat element on said fluid passage in said hollow piston rod in said piston chamber defined internally of said hollow piston whereby said valve element is engaged and moved by said valve seat element.

8. The pilot valve claimed in claim 6 wherein said fluid control member movably secured to said hollow piston is connected by a slot defined in said fluid control member and a pin secured to said hollow piston rod and through said slot.

9. The pilot valve claimed in claim 6 further comprising a spring adapter positioned on said head end of said piston, a calibrating spring secured to said main valve body and engaging said spring adapter, a pressure sensing chamber between said spring adapter and said head end of said piston, and means for communicating said pressure sensing chamber and said pressure sensing end of said piston.

10. A pilot valve for controlling fluid flow through a main valve wherein said main valve includes a valve body with an inlet and an outlet, a control valve chamber in said valve body between said inlet and said outlet, a control valve member reciprocally mounted in said control valve chamber for engaging said inlet to control fluid flow therethrough, a pressure control chamber adjacent said control valve member, said pilot valve comprising;

a pilot valve housing;
a first bore in said housing;
a second bore in said housing;
a first passage connecting said first and second bores;
a piston reciprocally mounted in said first bore; said piston including a head portion and a pressure sensing portion; said piston further including a piston rod extending from said pressure sensing portion through said first passage into said second bore; a second passage in said piston rod; said piston further including an internal chamber, said second passage communicating said internal chamber with said second bore;
a first valve seat member mounted in said internal chamber on said second passage;
a first closure member movably mounted on said pilot valve housing and in said internal chamber, said first closure member engaged by said valve seat member upon movement of a predetermined distance by said piston;
means for communicating said second bore to said outlet of said main valve; and
a second valve seat member on said communicating means; a second closure member movably mounted on said piston rod in said second bore, said first and second closure members being coaxial.

11. The pilot valve set forth in claim 10 wherein said first closure member is secured to said housing by a slot in said first closure member and a pin in said housing extending through said slot; said second closure member is secured to said piston rod by a slot in said closure member and a pin in said piston rod extending into said slot in said second closure member.

12. The pilot valve set forth in claim 10 further comprising a spring retainer mounted on said piston head portion; a calibrating spring mounted on said housing and engaging said spring retainer; a pressure sensing chamber between said spring retainer and said head portion of said piston; a third passage communicating said pressure sensing chamber and said pressure sensing portion of said piston; and means for communicating said first bore and said pressure sensing portion of said piston with said inlet of said main valve.

13. The pilot valve set forth in claim 10 further comprising a fourth passage communicating said pressure control chamber with said second bore.

14. The pilot valve of claim 1 further comprising:
an annular clearance space defined by said piston and pilot first bore;
a diaphragm extending from said piston head end across said annular clearance space, said diaphragm having an essentially circular outer edge;
means sealingly engaging the chamber inner surface and outer edge;
wherein fluid entering said annular clearance is contained.

* * * * *